United States Patent [19]

Niino

[11] Patent Number: 5,177,777
[45] Date of Patent: Jan. 5, 1993

[54] X-RAY IMAGING APPARATUS

[75] Inventor: Masao Niino, Okazaki, Japan

[73] Assignee: Kowa Company Ltd., Japan

[21] Appl. No.: 639,666

[22] Filed: Jan. 9, 1991

[30] Foreign Application Priority Data

Jan. 24, 1990 [JP] Japan .................... 2-4637

[51] Int. Cl.⁵ .............................. H05G 1/64
[52] U.S. Cl. ...................... 378/99; 378/62; 378/108; 358/111
[58] Field of Search ............ 378/99, 98, 62, 108–112; 358/111

[56] References Cited

U.S. PATENT DOCUMENTS

| | | | |
|---|---|---|---|
| 4,063,092 | 12/1977 | Berdahl | 378/99 |
| 4,355,331 | 10/1982 | Georges et al. | 378/99 |
| 4,675,731 | 6/1987 | Takasu et al. | 378/99 |
| 4,706,268 | 11/1987 | Onodera | 378/99 |
| 4,749,257 | 6/1988 | Klausz | 378/99 |
| 4,918,534 | 4/1990 | Lam et al. | 378/99 |
| 4,982,418 | 1/1991 | Kuehnel | 378/99 |
| 5,029,338 | 7/1991 | Aichinger et al. | 378/99 |

Primary Examiner—David P. Porter
Attorney, Agent, or Firm—Bruce L. Adams; Van C. Wilks

[57] ABSTRACT

An X-ray imaging apparatus has an image intensifier for converting an X-ray shadowgram of a patient into visible light. A primary lens group collimates the visible light and a secondary lens group forms the image carried by the visible light on a TV imaging device. The primary lens group is provided with a beam splitter for reflecting a part of the light output by the image intensifier toward the secondary lens group and transmitting the remainder thereof to a pick-up optical system for detecting the brightness of the image output by the image intensifier. The exposure of the patient to X-rays can be controlled on the basis of the detected brightness.

8 Claims, 2 Drawing Sheets

X-RAY IMAGING APPARATUS

BACKGROUND OF THE INVENTION

1. Field of the Invention

This invention relates to an X-ray imaging apparatus, and more particularly to an X-ray imaging apparatus wherein the amount of exposure of the object being imaged to the X-rays can be controlled by detecting the brightness of the image output by an image intensifier for converting an X-ray shadowgram into visible light.

2. Description of the Prior Art

In the control of the amount of exposure of an object such as a part of the human body to X-rays during X-ray imaging of the object, there are known techniques for detecting the brightness of the image output by the image intensifier constituting a part of the X-ray image intensifier optical system and used for converting the X-ray shadowgram into visible light.

In the conventional method for TV-imaging the X-ray image of an object, an image intensifier is disposed underneath the bed on which the object (patient) rests, a primary lens (primary lens group) is disposed at the output plane of the image intensifier, a beam splitter is disposed at an intermediate position between the primary lens and secondary lens groups, the light rays are passed through the beam splitter to a secondary lens (secondary lens group), and the light rays exiting from the secondary lens group are passed to a TV imaging device which produces a TV image of the object. A pick-up optical system is further disposed between the primary and secondary lens groups for measuring the amount of radiation transmitted through the patient resting on the bed, and the brightness of the image output by the image intensifier is controlled on the basis of measured value.

In the conventional arrangement, the pick-up optical system has ordinarily been disposed between the primary and secondary lens groups, as shown in FIG. 3. More specifically, a large diameter primary lens group 24 and a secondary lens group 25 (both groups being represented as single lenses in the drawing in the interest of simplicity) are disposed at a relatively long distance d from each other and a pick-up optical system 26 is disposed therebetween. The pick-up optical system 26 is constituted of a pick-up lens 26a made up of a lens and a prism, a field aperture 27, a condensing lens 26b and a photo-detector 26c. A part of the light of the image intensifier output image coming out of the primary lens group 24 is passed to the field aperture 27 by the pick-up lens 26a and forms an image at the field aperture 27. The field aperture 27 has an aperture which passes only a prescribed diameter portion of the image intensifier output image light and the light passing through the aperture of the field aperture 27 advances through the condensing lens 26b to the photo-detector 26c.

This arrangement has the following problems:

a) Since the primary and secondary lens groups have to be separated by a long distance (tandem interval), the size of the X-ray image intensifier optical system becomes large. Since the height of the bed above the floor is standardized within fairly narrow limits and cannot be increased substantially, any increase in the size of the X-ray image intensifier optical system is disadvantageous. Further, since shading (vignetting) occurs when the amount of peripheral light is insufficient, the diameter of the primary lens group has to be increased to secure an adequate amount of ambient light.

b) The positioning of the pick-up lens is critical and has to be very carefully selected so that a shadow of the pick-up lens does not appear in the TV image and degrade the X-ray image. Moreover, the occurrence of such a shadow cannot be avoided without using a primary lens of adequately large diameter.

SUMMARY OF THE INVENTION

In view of the aforesaid shortcomings of the conventional X-ray imaging apparatus, an object of the invention is to provide an X-ray imaging apparatus which enables the diameter of the primary lens group to be reduced and the X-ray image intensifier optical system to be made more compact. Another object of the present invention is to provide an x-ray imaging apparatus which also prevents the appearance of a pick-up lens shadow.

For achieving these objects, the present invention provides, in an X-ray imaging apparatus comprising an image intensifier for converting a shadowgram obtained by irradiating an object with X-rays from an X-ray source into visible light, a primary lens group for collimating the light output by the image intensifier and a secondary lens group for forming the image carried by the light collimated by the primary lens group on a TV imaging device. An improved apparatus is provided wherein the primary lens group comprises a beam splitter which reflects a part of the light output by the image intensifier toward the secondary lens group and transmits the remainder thereof, and the brightness of the image output by the image intensifier is detected by measuring the amount of light transmitted by the beam splitter.

With this arrangement, according to the present invention, the pick-up optical system does not have to be located between the primary and secondary lens groups, the optical system does not have to be large and the diameter of the primary lens group can be made small since the shadow of the pick-up lens does not affect the secondary lens group.

BRIEF DESCRIPTION OF THE DRAWINGS

The objects and features of the present invention will become more apparent from a consideration of the following description taken in conjunction with the accompanying drawings in which.

DETAILED DESCRIPTION OF THE PREFERRED EMBODIMENTS

The invention will now be described more fully with reference to the attached drawings.

Figure 1:
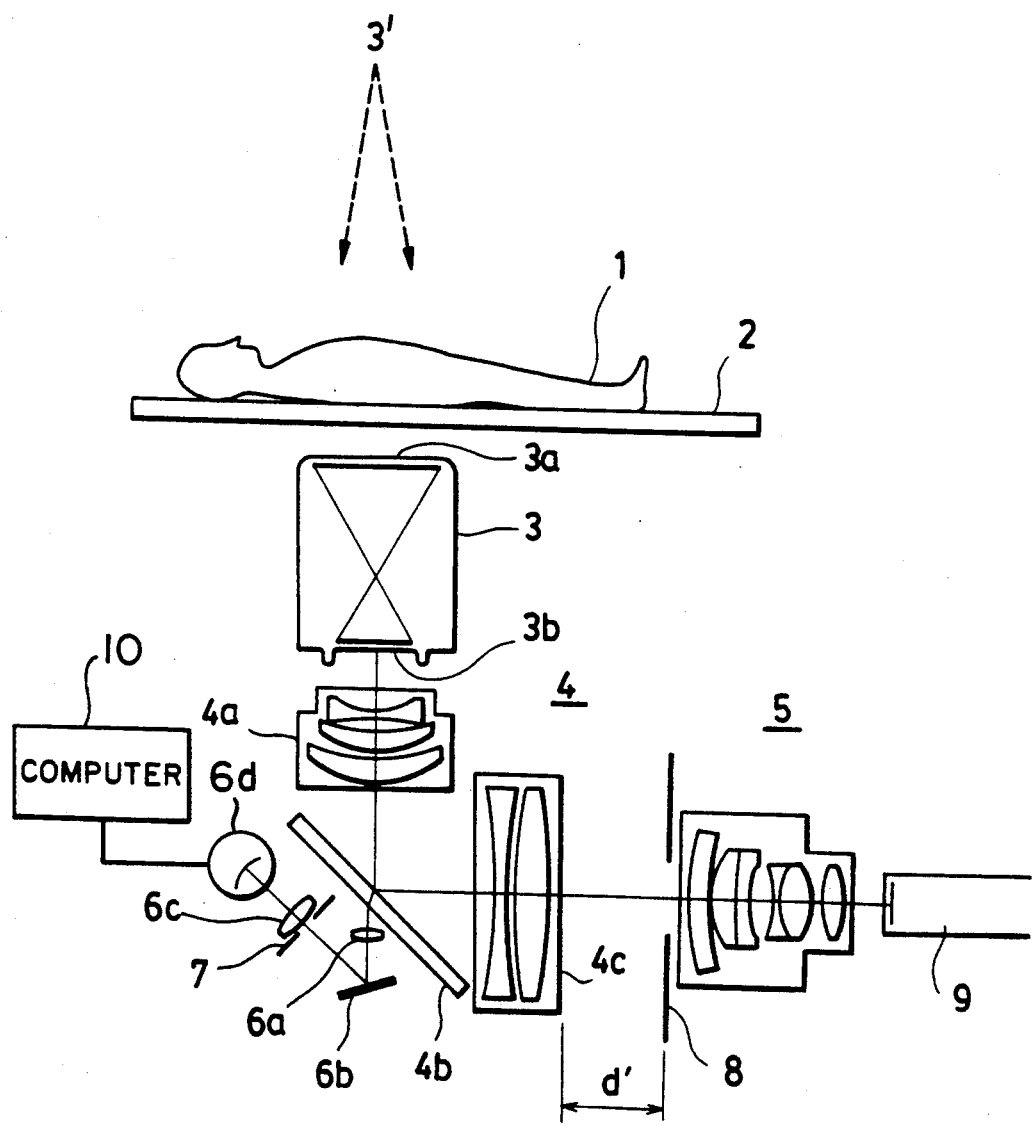
FIG. 1 is a schematic view of the optical system of an X-ray imaging apparatus according to the present invention.

As shown in the overall arrangement of the X-ray imaging apparatus according to the invention illustrated in FIG. 1, an image intensifier 3 is disposed under a bed 2 on which an object (patient) 1 to be imaged rests. Beneath the image intensifier 3 is disposed a primary lens group 4 for collimating light output by the image intensifier 3. The primary lens group 4 is comprised of a rear lens group 4a, a beam splitter 4b and a front lens group 4c. The transmittance and reflectance of the beam splitter 4b are, for example, 10% and 90%, so that 10% of the light from the rear lens group 4a passes through the beam splitter 4b and the remaining 90% thereof is reflected by the beam splitter 4b to have its direction of travel deflected by 90°. A secondary lens group 5 is disposed rearward of the primary lens group 4 by a distance d' from the front lens group 4c. The distance d' is shorter than the distance d between the primary and secondary lens groups in the prior art arrangement shown in FIG. 3. A diaphragm 8 is disposed in front of, and a TV imaging device 9 is provided behind, the secondary lens group 5.

A pick-up lens 6a is disposed behind the beam splitter 4b and a reflection mirror 6b is disposed below the pick-up lens 6a. A field aperture 7 and a condensing lens 6c are disposed in the vicinity of the reflection mirror 6b and a photo-detector 6d is provided behind the condensing lens 6c.

The operation of the so-arranged X-ray imaging apparatus according to this invention will now be explained.

The object (patient) 1 is rested on the bed 2 and is exposed to X-rays from an X-ray source 3'. The X-rays passing through the object 1 and the bed 2 are received by the image intensifier 3 beneath the bed 2. The X-ray shadowgram received at the input plane 3a of the image intensifier 3 (or converting means) is converted into visible light by the image intensifier 3 and is output as a visible image (fluorescent image) at an output plane 3b. The light from the output plane 3b of the image intensifier 3 enters rear lens group 4a of the primary lens group 4. A part, (e.g. 90%), of the light passing through the rear lens group 4a and striking the beam splitter 4b is deflected by 90° and directed toward the front lens group 4c. After passing through the front lens group 4c. This light advances through the diaphragm 8 into the secondary lens group 5 and then enters the TV imaging device 9 where it forms an image. An X-ray image of the patient is thus obtained.

The remainder (e.g. 10%), of the light entering the primary lens group 4 from the image intensifier 3 which is transmitted by the beam splitter 4b disposed between the rear lens group 4a and the front lens group 4c passes through the pick-up lens 6a and is reflected by the reflection mirror 6b onto the field aperture 7 to form an image thereat. The field aperture 7 has an aperture of prescribed diameter so that only a prescribed diameter portion of the light output by the image intensifier is allowed to reach the condensing lens 6c. The light condensed by the condensing lens 6c advances to the photo-detector 6d, which, on the basis thereof, determines the amount of exposure of the patient to X-rays. The brightness of the light output by the image intensifier 3 is then compared with a prescribed standard value in a computer 10 and the brightness of the image intensifier 3 is controlled on the basis of the comparison value.

Figure 2:
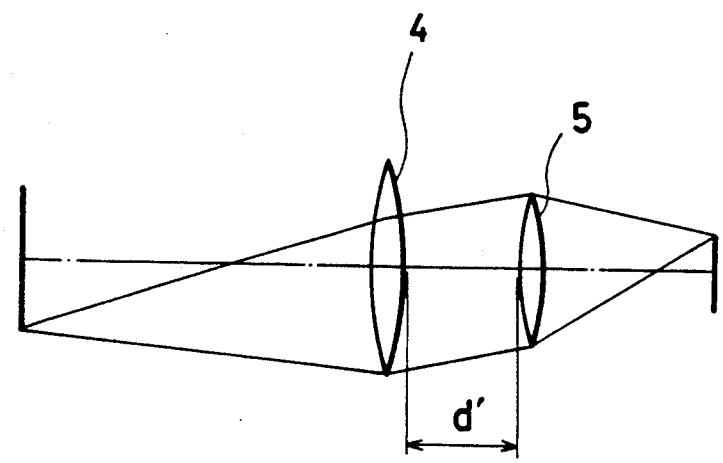
FIG. 2 is an explanatory view showing the arrangement of primary and secondary lenses according to the present invention.
Figure 3:
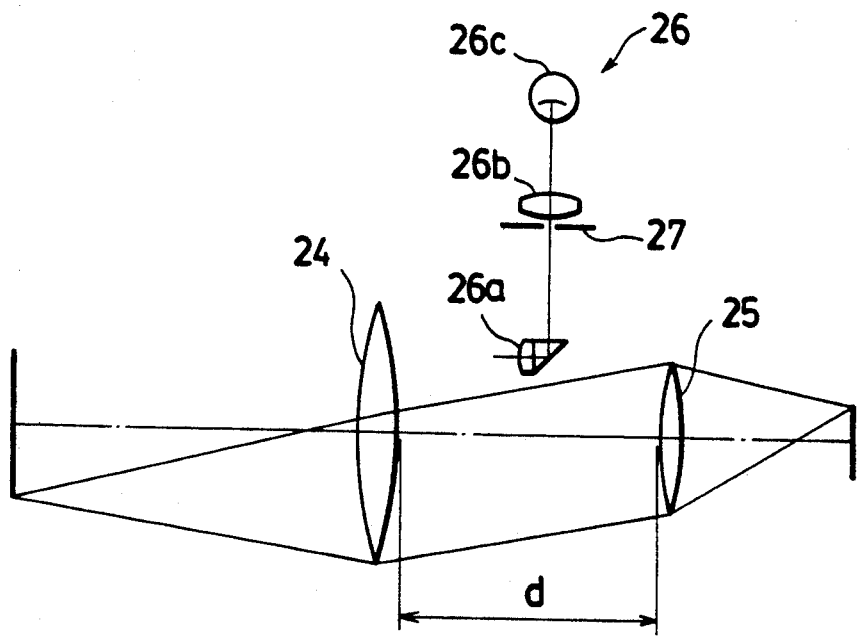
FIG. 3 is an explanatory view showing the arrangement of primary and secondary lenses according to the prior art.

Since, as shown in FIG. 2, the aforesaid arrangement eliminates the need for disposing the pick-up optical system between the primary lens group 4 and the secondary lens group 5, the distance d' between the two lens groups can be made markedly smaller than the distance d in the case of the conventional arrangement shown in FIG. 3. As a result, the optical system of the X-ray image intensifier can be made more compact.

As explained in the foregoing, in the X-ray imaging apparatus according to the present invention, since the pick-up optical system is not disposed between the primary lens group and the secondary lens group, there is no need for a large X-ray image intensifier optical system. Moreover since the shadow of the pick-up lens has no effect on the secondary lens group, it is possible to reduce the diameter of the primary lens group.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. An X-ray imaging apparatus, comprising: an image intensifier for converting a shadowgram obtained by irradiating an object with X-rays from an X-ray source into visible light; a primary lens group, including a rear lens group and a front lens group, for collimating the light output from the image intensifier; and a secondary lens group for forming the image carried by the light collimated by the primary lens group on a TV imaging device; wherein the primary lens group comprises a beam splitter, disposed between the rear lens group and the front lens group, which reflects a part of the light output by the image intensifier toward the secondary lens group and transmits the remainder thereof, and wherein the brightness of the image output by the image intensifier is detected by measuring the amount of light transmitted by the beam splitter.

2. An X-ray imaging apparatus according to claim 1, further comprising means for controlling the amount of exposure of an object to x-rays during X-ray imaging of the object in dependence on the detected brightness.

3. An x-ray imaging apparatus, comprising: image converting means for converting an x-ray shadowgram into visible light; a primary lens group for collimating the visible light and including a beam splitter for reflecting a first part of the visible light and transmitting a second part of the visible light; a secondary lens group for receiving either of the first part and the second part of the visible light from the beam splitter and forming an image; and a brightness detector for receiving either of the first part and the second part of the visible light that is not received by the secondary lens group and detecting a brightness dependent on the visible light and producing an output signal in response thereto; wherein the primary lens group includes a rear lens group for receiving the visible light and a front lens group for passing the collimated visible light to the secondary lens group, and wherein the beam splitter is disposed between the rear lens group and the front lens group.

4. An x-ray imaging apparatus according to claim 3, further comprising a TV imaging device for receiving the image and generating a TV image in response thereto.

5. An x-ray imaging apparatus according to claim 4, wherein the secondary lens group receives the first part of the visible light.

6. An x-ray imaging apparatus according to claim 4, further comprising means receptive of the output signal for controlling an amount of exposure of an object to x-rays during generation of the shadowgram by x-ray imaging of the object.

7. An x-ray imaging apparatus according to claim 3, further comprising means receptive of the output signal for controlling the amount of exposure of an object to x-rays during generation of the shadowgram by x-ray imaging of the object.

8. An x-ray imaging apparatus according to claim 5, further comprising means receptive of the output signal for controlling the amount of exposure of an object to x-rays during generation of the shadowgram by x-ray imaging of the object.

* * * * *